United States Patent [19]
Roulet

[11] Patent Number: 5,694,965
[45] Date of Patent: Dec. 9, 1997

[54] PNEUMATIC PRESSURE REGULATOR

[75] Inventor: Donald R. Roulet, West Linn, Oreg.

[73] Assignee: Maverick International, Inc., West Linn, Oreg.

[21] Appl. No.: 603,349

[22] Filed: Mar. 4, 1996

[51] Int. Cl.[6] .................................................. G05D 16/10
[52] U.S. Cl. .................... 137/102; 137/484.4; 137/599.2
[58] Field of Search ........................... 137/102, 484.2, 137/484.4, 508, 599.2, 543.19

[56] References Cited

U.S. PATENT DOCUMENTS

| | | | |
|---|---|---|---|
| 1,747,456 | 2/1930 | Noble | 137/543.19 |
| 3,002,520 | 10/1961 | Morse | 137/102 |
| 3,316,926 | 5/1967 | Worth | 137/102 |
| 3,545,887 | 12/1970 | Kobnick | 417/307 |
| 3,670,756 | 6/1972 | Schultz | 137/102 |
| 3,834,837 | 9/1974 | Nickell | 137/102 X |
| 3,928,984 | 12/1975 | Nickell | 62/196 |
| 4,039,003 | 8/1977 | Cheek | 137/543.19 X |
| 4,114,515 | 9/1978 | Pauliukonis | 137/102 X |
| 4,450,860 | 5/1984 | Francis et al. | 137/543.19 |
| 4,505,648 | 3/1985 | Heger et al. | 417/297 |
| 4,553,907 | 11/1985 | Heger et al. | 417/297 |

FOREIGN PATENT DOCUMENTS 583465  10/1958  Italy .......................... 137/102

OTHER PUBLICATIONS

Bendix Instruction Sheet "Service Data–01–16", no date.

Primary Examiner—Stephen M. Hepperle
Attorney, Agent, or Firm—Olson & Olson

[57] ABSTRACT

In a pneumatic pressure regulator comprising a ported housing having an internal bore, within the bore a spring-pressed piston mounted for reciprocation between advanced and retracted positions, and valve means associated with the piston and operative to direct the flow of air to the respective housing ports; the improvement comprising a housing the bore of which is inwardly tapered in the direction of spring-pressed piston retraction. This results in decreased friction, and improved hysteresis characteristics.

9 Claims, 6 Drawing Sheets

CUT-OUT MODE

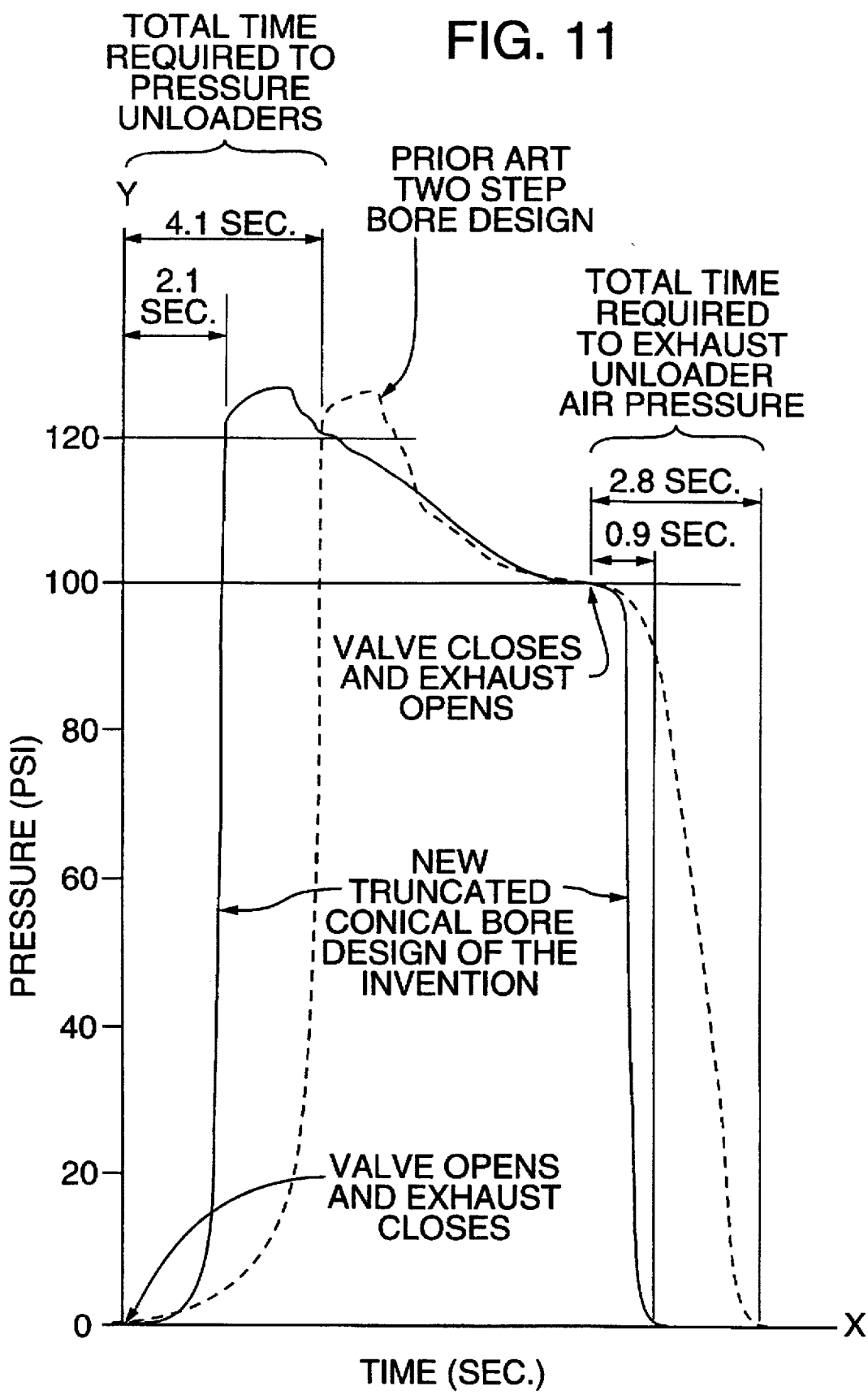

5,694,965

PNEUMATIC PRESSURE REGULATOR

BACKGROUND OF THE INVENTION

1. Field of the Invention

This invention relates to pneumatic pressure regulators. It pertains particularly to pneumatic pressure regulators (air compressor governors) of the class employed for cut-in and cut-out control of the air compressors used on trucks, buses and other vehicles.

2. Description of the Related Art

As is well known, trucks, buses and other vehicles employ pneumatic systems for the operation of air brakes and various related appliances. In these systems, the pressure is generated by an air compressor driven continuously by the vehicle engine. Although the compressor is driven continuously, the demand for pressurized air is not continuous. It accordingly becomes necessary to provide a reservoir for air storage and means for limiting the pressure in the reservoir between predetermined high and low limits. This, in turn, requires the use of an associated air compressor governor which functions to cut in the compressor to supply air to the reservoir when the reservoir pressure is at a low level and to cut out the supply of air to the reservoir when its pressurized contents is at the desired high pressure level.

The operation of conventional governors in use today is characterized by a substantial degree of hysteresis on both rising and falling reservoir pressures. In some instances it is responsible for slow activation and response times. This in turn results in destructive compressor valve chatter with accompanying reduction of compressor valve life.

It is the general purpose of the present invention to provide a pneumatic pressure regulator (air compressor governor) which in large measure overcomes this problem.

It is a further object of the present invention to provide an air compressor governor which improves reservoir pressure control between governor opening (cut-out) and governor closing (cut-in) modes by reducing governor valve hysteresis.

SUMMARY OF THE INVENTION

The foregoing and other objects of the invention are achieved by the provision of a pneumatic pressure regulator comprising a ported housing having an internal bore. A spring-pressed piston is mounted for reciprocation between advanced and retracted positions within the bore. Valve means is associated with the piston and is operative to direct the flow of air to the respective housing ports. The housing is inwardly tapered in the direction of spring-pressed piston retraction. In particular, the piston is fitted with annular O-rings and the relative degree of taper of the bore is predetermined to create a condition of O-ring compression squeeze in the retracted position of the piston and an O-ring floating condition with attendant reduced friction between bore and piston in the advanced position of the piston. The resultant decreased friction between bore and piston results in significant reduction of hysteresis as well as significant improvement in air pressure delivery.

THE DRAWINGS

In the drawings:

FIG. 11 is a graphic representation illustrating the performance of the herein described pneumatic pressure regulator of FIG. 4 in comparison with that of the prior art regulator of FIG. 5.

DESCRIPTION OF PREFERRED EMBODIMENTS OF THE INVENTION

Figure 1:
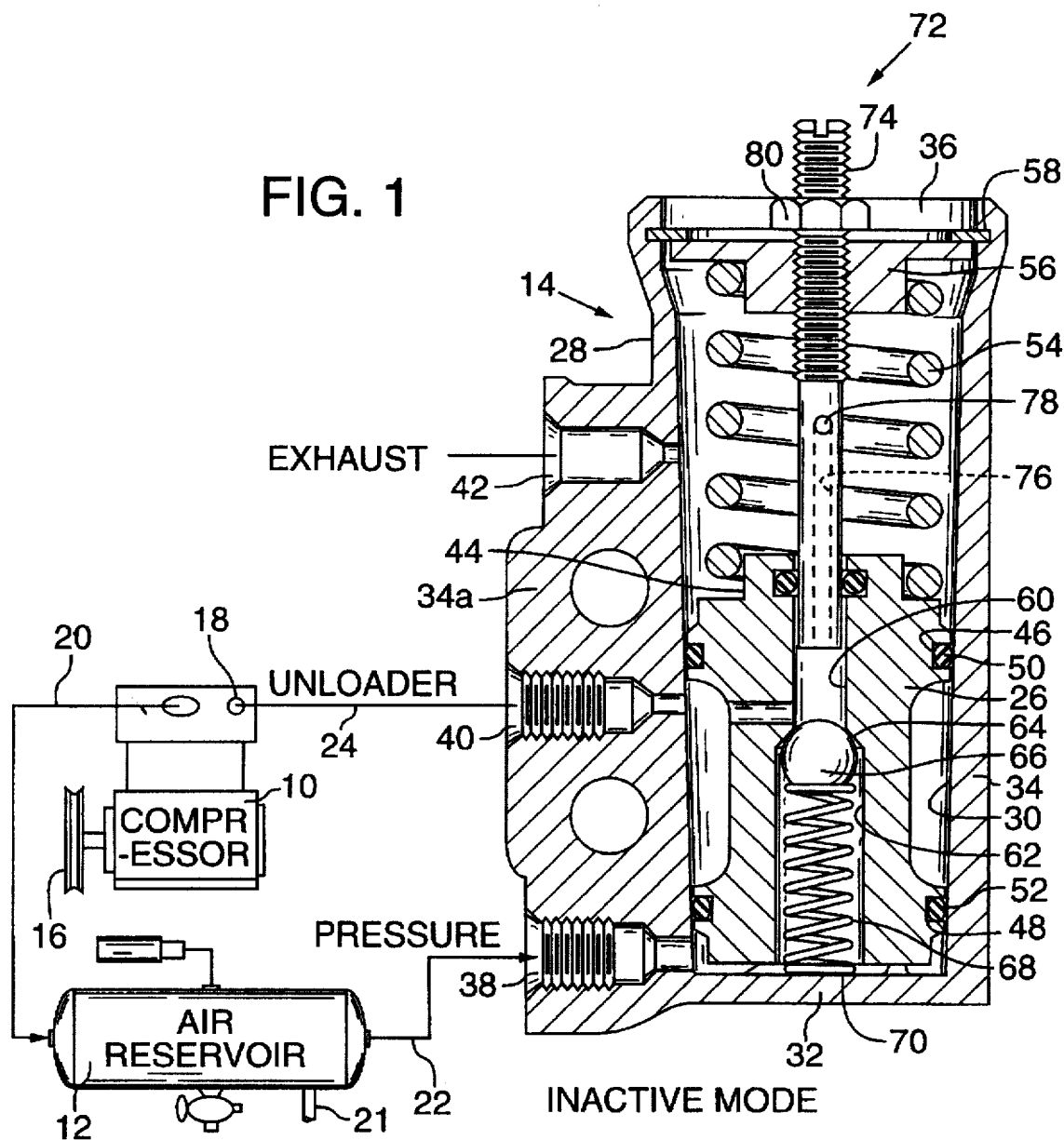
FIG. 1 is a schematic drawing of a pneumatic pressure regulator system including an enlarged view in vertical cross section of the regulator or governor component of the invention, illustrated in the inactive mode of the compressor.
Figure 2:
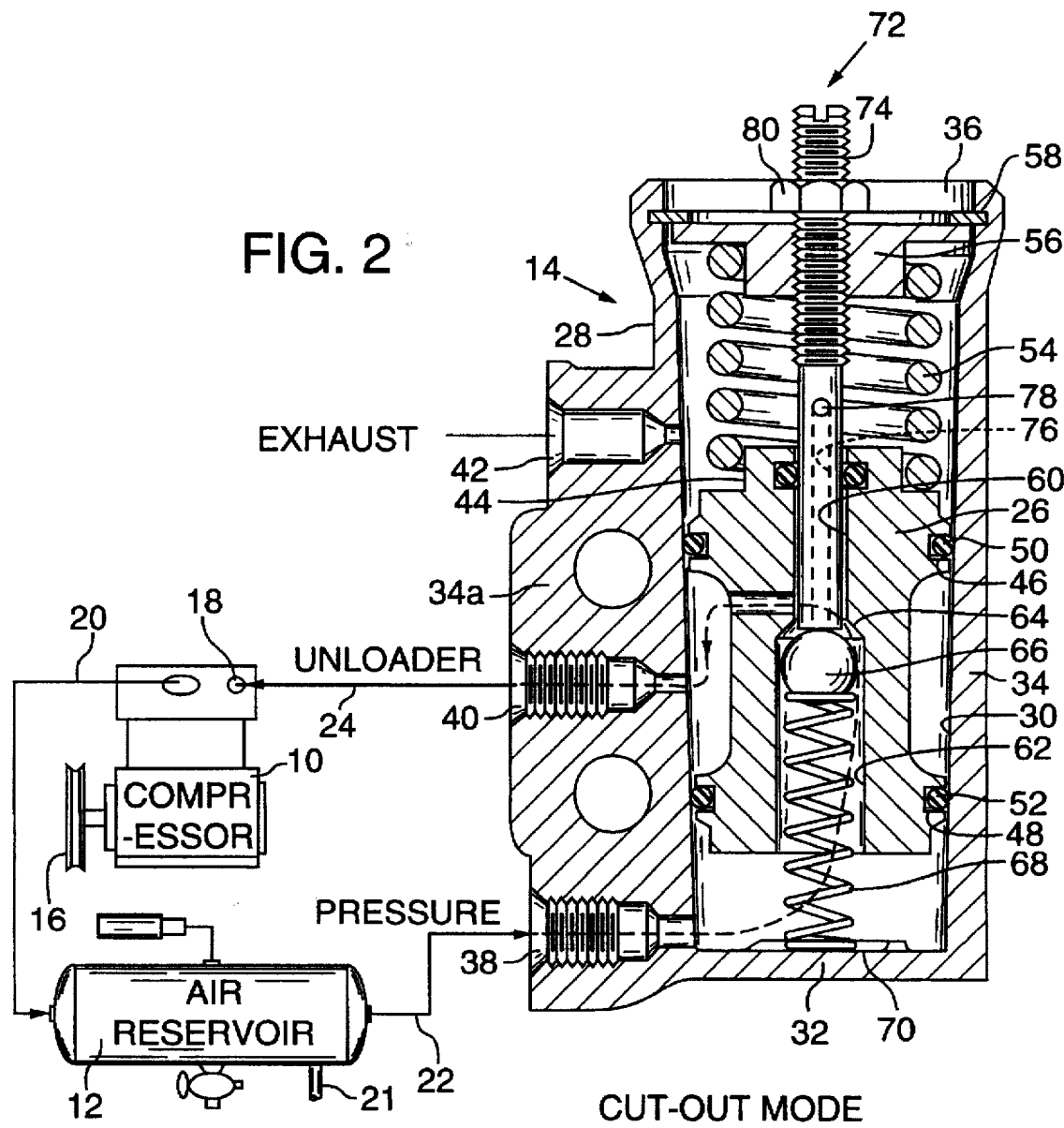
FIG. 2 is a view similar to FIG. 1, but illustrating the regulator in the cut-out compressor mode.
Figure 3:
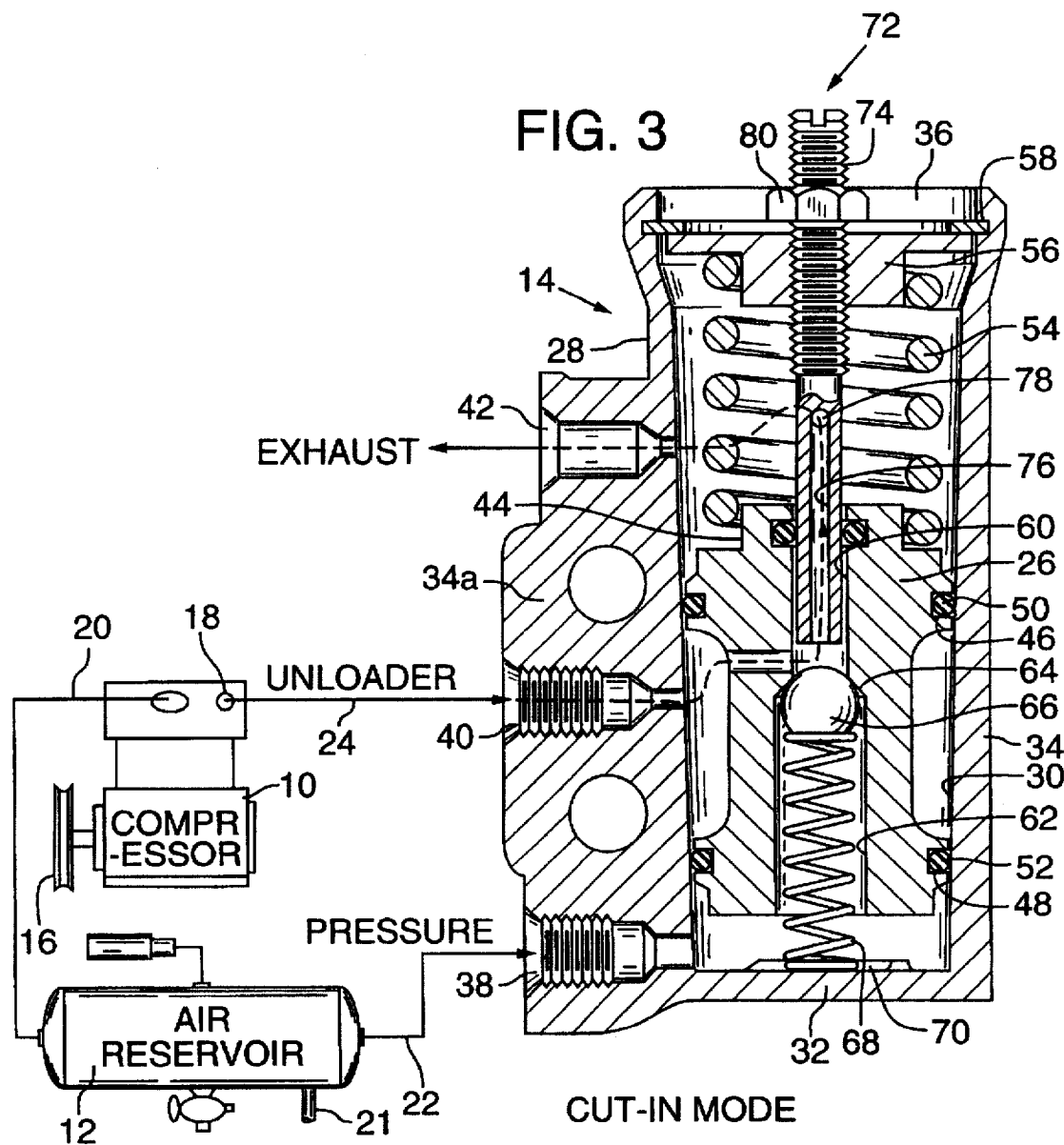
FIG. 3 is a view similar to FIGS. 1 and 2, but illustrating the regulator in the cut-in compressor mode.

In FIGS. 1-3 there is depicted a typical truck compressed air assembly including a compressor 10, an air reservoir 12, and a pneumatic pressure regulator or governor 14. The compressor typically is operated continuously over substantial periods of time by means of a belt and pulley assembly 16 or by means of direct drive coupling driven by the vehicle engine.

The compressor operates between "cut-in" and "cut-out" modes of operation in which it supplies and fails to supply, respectively, compressed air to the reservoir as required to maintain the air in the reservoir at the desired pressure. This function is accomplished by means of a conventional compressor unloader mechanism 18 associated with the compressor. When air under pressure is supplied to the the unloader, it functions to shift the compressor to its cut-out mode of operation. When pressurized air is removed from the unloader, it operates to shift the compressor to its cut-in mode of operation.

The three units of the assembly are interconnected by suitable conduits. A first conduit 20 delivers air under pressure to the reservoir from the compressor. A second conduit 21 transmits air from the reservoir to the vehicle brakes or other appliance. A third conduit 22 delivers air under pressure from the reservoir to the governor. A fourth conduit 24 is arranged to transfer air under pressure from the governor to the unloader component of the compressor.

The foregoing arrangement is conventional and widely, perhaps universally, used to supply air under pressure to the air braking and appliance assemblies of trucks and buses throughout the world. It is to the governor component 14 of the assembly that the present invention is directed.

Except for one novel feature, which is responsible for dramatically improving its performance, the governor itself is of familiar construction. Its novel feature resides in the provision of a housing 28 having a tapered bore 30 having the contour of a trucated cone, the taper being inwardly in the direction of piston retraction, FIG. 4.

Figure 5:
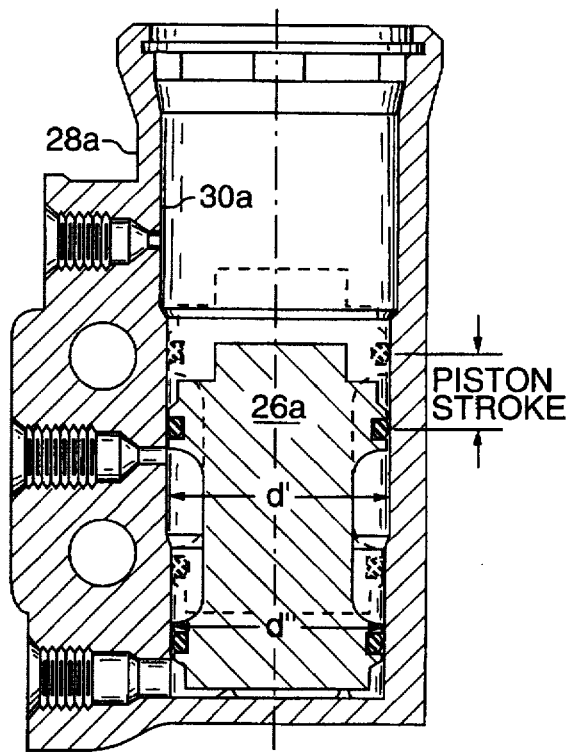
FIG. 5 is a view similar to FIG. 4, but illustrating a prior art construction.

This contrasts with the prior art governor construction illustrated in FIG. 5. Such construction is characterized by a piston 26a working in a housing 28a defining a bore 30a having a stepped configuration with respect to its longitudinal center line. In the FIG. 5 unit the relative diameters are indicated at d' and d" respectively. This differential bore is required in order to supply uniform pressure to the piston as it reciprocates in the ported housing.

As will be developed fully hereinafter, the tapered construction of the FIG. 4 embodiment overcomes the breakaway and running friction problems which characterize the prior art governor with the result that the governor opening and closing speeds are increased by 40–50% over the speeds which characterize the FIG. 5 prior art unit.

Returning to FIGS. 1–4:

As illustrated, the pneumatic pressure regulator or air compressor governor of my invention broadly comprises a housing 28 in which reciprocates a spring-pressed piston 26.

Housing 28 is generally cylindrical in contour. It has a bottom 32, a side wall 34 and an open top 36. A segment 34a of increased thickness of side wall 34 is provided with three ports 38, 40, 42. Port 38 is for connection to conduit 22, which connects the governor to reservoir 12. Port 40 is for connection to conduit 24, connecting the governor to the unloader component of the compressor. Port 42 simply exhausts to the atmosphere.

Piston 26, which works within bore 30 is of a dimension which generally matches the dimension of the bore. It is formed with a balance spring seat 44 at its top and a pair of longitudinally spaced O-ring grooves 46, 48 along its sides. O-rings 50, 52 are mounted in the O-ring grooves. These O-rings are piston seal O-rings which seal off the high and low pressure areas of the piston as it reciprocates within housing 28.

A substantial balance spring 54 is mounted to oppose the advancement of piston 26. It is mounted between balance spring seat 44 on the head of piston 26 and a cooperating seat 56, which is releasably secured in place by means of snap ring 58 in the open end of the housing.

Valve means are provided for directing the flow of air through the governor.

To this end, piston 26 has a longitudinal through hole stepped passageway 60, 62. At the juncture between the two segments of the passageway there is a ball valve seat 64 in which works a ball valve 66. The valve is retained in its operative position by means of a valve spring 68. One end of the spring supports the ball, while the other end is retained in a valve spring seat 70 mounted on the bottom 32 of the housing.

Operation of the valve is obtained through the agency of an adjustable valve stem actuator 72. The upper end 74 of the actuator is threaded for adjustment. Its lower end contains a longitudinal passageway 76 with port 78. The threaded end 74 of the valve stem is threaded into upper balance spring seat 56 and retained in the desired position of adjustment by means of jam nut 80.

As noted above, the unique feature of the regulator resides in the fact that it is characterized by a housing having an interior bore which is inwardly tapered in the direction of spring-pressed piston retraction, i.e. the position of FIG. 1. It accordingly has the configuration of a truncated cone. As shown in FIG. 4, the angle ("a") of taper of the bore side wall with reference to the longitudinal center line of the governor is such that the relative taper of the bore and piston is predetermined to create substantially a condition of O-ring compression seal between bore and piston in the retracted position of the piston and a condition of O-ring floating seal with attendant reduced friction between bore and piston in the advanced position of the piston. Considered numerically, the degree of taper is from about 0 15' to about 5 0', preferably from about 0 15' to about 3 0'.

Figure 6:
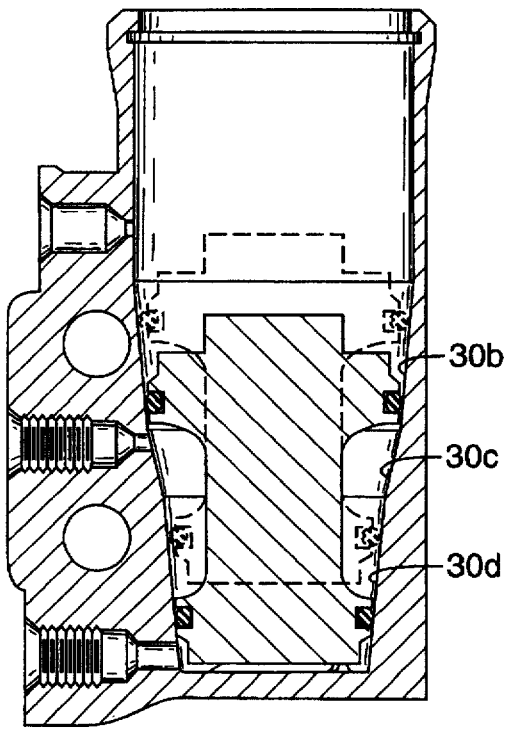
FIGS. 6, 7 and 8 are views in vertical cross section illustrating alternate constructions of the regulator.
Figure 7:
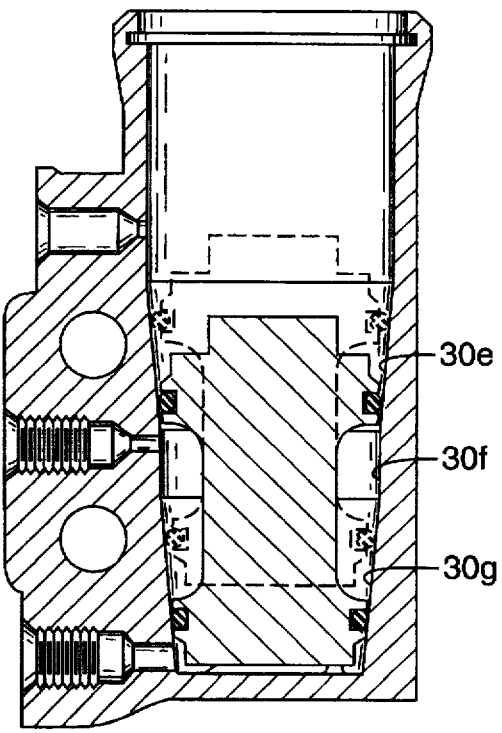

The bore taper may be continuous, as illustrated in FIGS. 1–4, or segmented as shown in FIGS. 6 and 7. In FIG. 6, for example, a bore is illustrated having three tapered bore segments 30b, 30c, and 30d, segments 30b and 30d being working segments and segment 30c being a non-working, tapered segment. In FIG. 7, there are three such segments 30e, 30f, 30g, segments 30e and 30g being tapered, and segment 30f being non-tapered. These configurations may be advantagous for some purposes.

Figure 8:
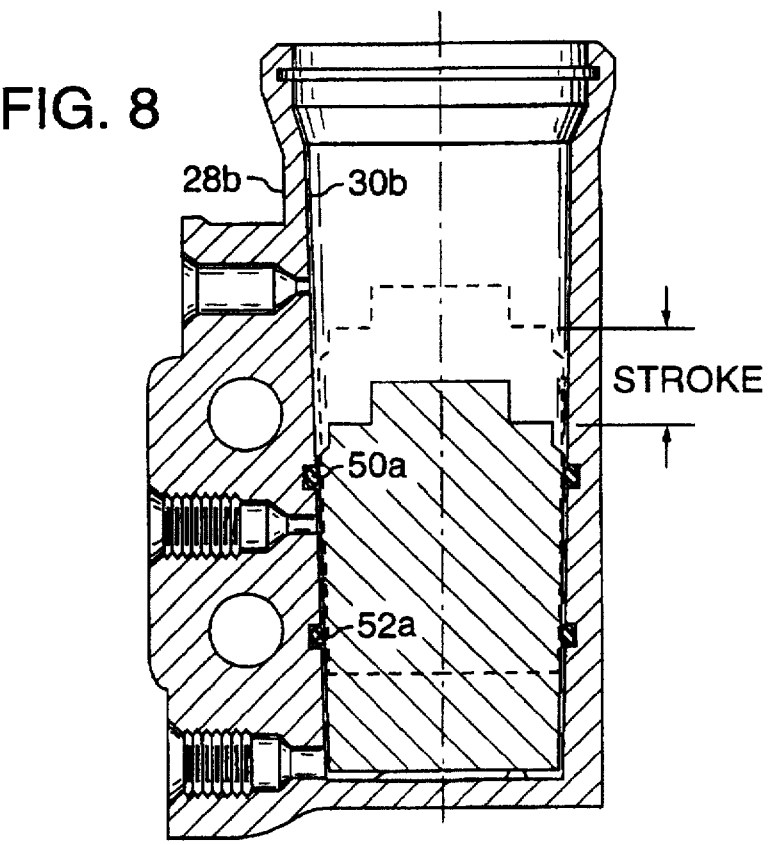

As a further alternate embodiment, the governor assembly may be constructed with the O-rings 50, 52 mounted in the side walls of the housing bore, rather than in the side walls of the pistons. Such a construction is shown in FIG. 8.

In this construction the housing 28b has a bore 30b having interior, longitudinally spaced O-ring assemblies 50a, 52a. This construction also may be useful for some purposes.

OPERATION

The operation of the herein described pneumatic pressure regulator is as follows:

FIG. 1 illustrates the rest position of the air compressing apparatus with the air compressor regulator (governor) 14 poised for activation. Piston 26 is bottomed out in housing 28 with the chamber below the piston in open communication with air reservoir 12 via conduit 22 and governor port 38.

When the air in reservoir 12 becomes pressurized to a predetermined level, as by starting the vehicle, or by continued operation of compressor 10, the piston moves upwardly (extends) against the predetermined pressure of balance spring 54 until it reaches its maximum preset position of extension of FIG. 2. In this position ball valve 66 has been opened by the action of adjustable valve actuator 72. This opens a passageway from the chamber below piston 26, through passage 62 in the piston, and out port 40 in housing 28. Air under pressure then is conveyed by conduit 24 into the unloader component 18 of compressor 10. In the unloader, it acts in known manner to discontinue the supply of compressed air to reservoir 12.

When a demand is placed on air reservoir 12 for the delivery of compressed air to the vehicle brakes or other appliance via conduit 21, the pressure in the reservoir diminishes. When it has been diminished to the predetermined level, balance spring 54 acts to shift (retract) the piston to its FIG. 3 position. In this position the compressed air in the unloader is placed in communication with exhaust port 42 via conduit 24, passageway 76, and port 78 in valve actuator 72, and ball valve 66, closes on seat 64, thus cutting off air communication from reservoir 12, to the unloader 18.

Upon the release of air pressure in unloader 18, conditions are set for the resumption of the air supply from the compressor to the reservoir. In the meantime, piston 26, maintains an intermediate position in bore 30, relative to the amount of air reservoir pressure forcing piston 26, against balance spring 54. As reservoir air pressure continues to increase piston 26 will move upward until it reaches maximum position again, FIG. 2. This cycle repeats itself over and over as the compressed air in reservoir 12 is applied to its various functions.

In the foregoing cycle of operation, it is critical that piston 26 start promptly with each actuation and move smoothly without interruption through each cycle. These desiderata are opposed by two factors: The tendency of O-rings 50, 52 to stick against the housing bore side walls as the piston shifts from its rest to its active conditions, and the friction developed between the O-rings and the side wall during motion of the piston, because of O-ring compression ("squeeze"). These difficulties attend the operation of the widely used present day governors of the class illustrated in FIG. 5. As noted, such governors have stepped bores 30a characterized by differential diameters d', d". However, during the entire operating cycle of their component pistons, the O-rings in the performance of their sealing function are under a constant condition of O-ring squeeze. This causes the noted problem.

I have discovered that this problem is significantly relieved by the provision of the above-described governor housing having a bore tapered in the configuration of a truncated cone. The taper is inwardly, in the direction of piston retraction, i.e. toward the bottom of the housing as illustrated in the figures of the drawings. When this is done, the piston O-rings are in a condition of compression seal in the retracted position of the piston and a condition of floating seal with attendant reduced friction and elimination of sticking between bore and piston in the extended position of the piston. At the same time, an adequate seal is retained to accomplish the purposes of the governor assembly in both positions of the piston.

Figure 9:
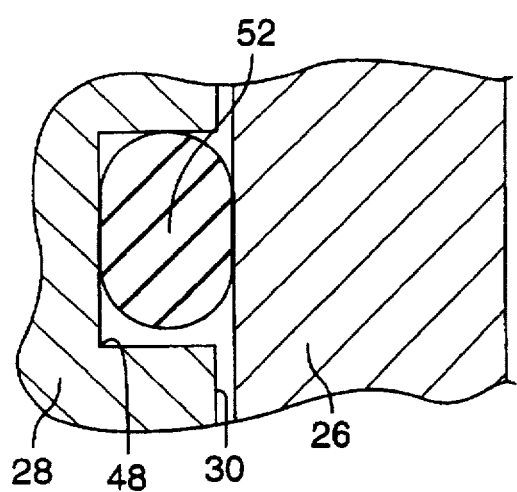
FIG. 9 is a detailed view illustrating a piston O-ring compression squeeze condition which is characteristic of the regulator of the assembly in its FIG. 1 position.
Figure 10:
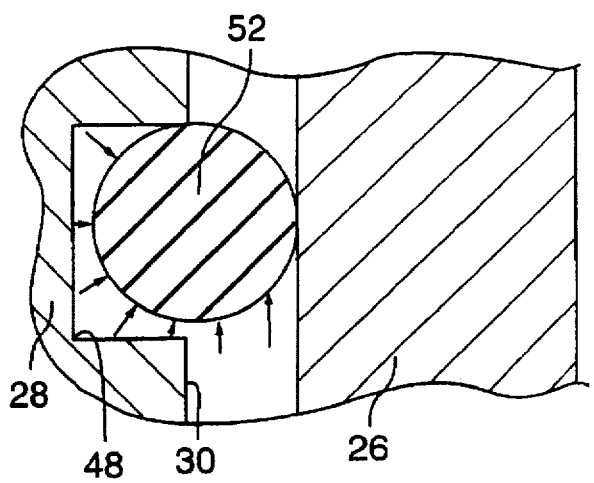
FIG. 10 is an enlarged, detailed view in cross section of a piston O-ring seal subassembly illustrated in the O-ring-floating condition of FIG. 2.

The mechanism by which this is accomplished is illustrated in FIGS. 9 and 10. In these illustrations FIG. 9 illustrates the condition of O-ring compression (squeeze) which is characteristic of the piston O-rings. For example when the piston is in its FIG. 1 position of maximum retraction in which it bottoms in the housing bore area of minimum diameter, O-rings 50 and 52 are in a compressed condition, tightly squeezed between piston grooves 46 and 48 and bore wall 30. This establishes the tight and durable seal required when the unit is at rest. However, it also establishes a condition which leads to high breakaway friction, and resultant hysteresis upon actuation of the piston, as noted above.

As the piston moves upwardly (advances) under the influence of increased pressure from reservoir 12, this condition is relieved. As the diameter of the bore increases, the O-rings shift from their FIG. 9 condition to their FIG. 10 condition. In the latter "floating" condition breakaway friction and hysteresis are minimized. However, an adequate seal is maintained because the air pressure on one side of the O-ring forces it into sealing engagement with the surrounding structure on the low pressure side, as illustrated by the arrows of FIG. 10.

Stated otherwise, when piston 26 is forced to the bottom of the housing bore by balance spring 54, both upper and lower piston O-rings are compressed between the bottom of the O-ring grooves 46, 48 and the tapered wall of the cylinder. As the reservoir pressure increases, the piston is pushed upwardly against the force of the balance spring. As it moves upwardly, O-ring compression (squeeze) is reduced because the distance between the cylinder wall and the bottom surfaces of the O-ring grooves increases. This reduces squeeze on the O-rings. As the piston reaches full stroke, i.e. the position of FIG. 2, the distance between the O-ring seats and the housing wall is great enough for the O-rings to go into a floating seal. As the piston moves in this manner, from maximum squeeze to a floating condition, O-ring squeeze and hence friction are reduced.

My invention accordingly reduces internal governor friction and quickens governor activation time while shortening the exhaust time. Activation time is defined as the total time required from the initial opening of the piston valve until full reservoir pressure is delivered to the unloader mechanism. Exhaust time is defined as the total time required from initial closing of the piston valve and concurrent opening of the exhaust passageway until all air pressure from the unloader mechanism is exhausted to atmosphere.

The invention improves governor activation time and reduces exhaust time by constantly changing the piston effective area relative to piston stroke by means of a tapered bore. During the operating cycle of governor opening and closing, sliding friction on the piston O-ring seals is reduced by a constant reduction of peripheral squeeze on the O-ring seals. As the piston advances in the bore, O-ring squeeze diminishes. Conversely, as the piston retracts, O-ring squeeze increases. This produces the noted improvement in activation time and exhaust time.

The undesirable hysteresis effect which characterizes present day governors accordingly to a large extent is eliminated.

Figure 4:
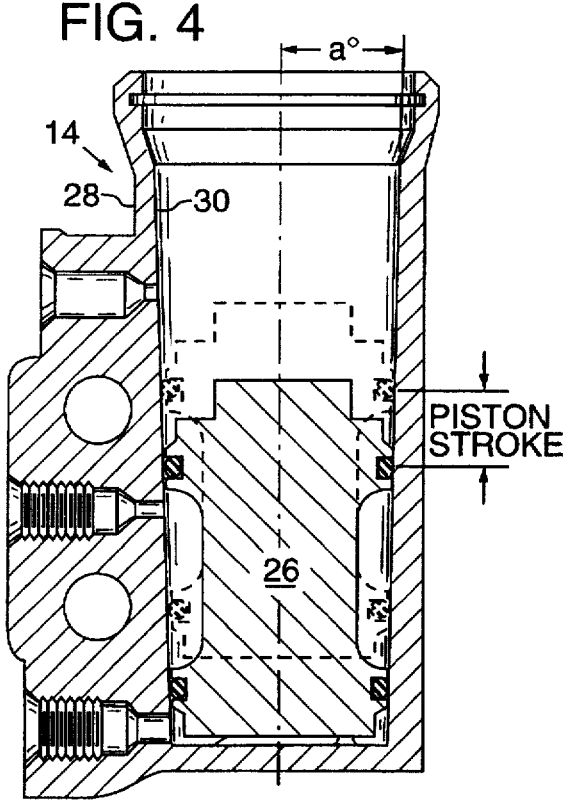
FIG. 4 is a view of the regulator in vertical cross section with parts removed for better illustration of the tapered bore feature.

The above conclusion has been verified by tests comparing the performance of the governor of the invention illustrated in FIG. 4 wherein the angle of bevel "a" was 1°30' with the performance under identical conditions of the prior art governor of FIG. 5 wherein d" was 1.230" and d' was 1.264". The test was carried out by setting up a system such as is illustrated in FIGS. 1-3 and measuring the pressure at the unloader port relative to time and the decreasing unloader exhaust pressure, also relative to time.

The test was carried out using an analog type X-Y plotter/recorder in which the "Y" axis was connected to an electronic sensor which measured pressure at the unloader port. The time base function on the X-axis was used to measure time.

FIG. 11 comprises X-Y charts showing the differences between the two bore designs. It is clear from this figure that governor reaction time is significantly quicker. After overcoming initial break away friction, the pressure falls or increases much more rapidly in the case of the governor of the invention. With the old two step bore design, friction is greater and additional time is needed to overcome it and to reach full pressure or zero exhaust pressure.

Specifically, the mean time required to pressurize the unloader was 4.1 seconds in the case of the prior art governor of FIG. 5 as opposed to only 2.1 seconds in the case of the governor of the invention, illustrated in FIG. 4. This is a 49% improvement.

Similarly, measurement of the total time required to exhaust the unloader improved the mean time required from 2.8 seconds (FIG. 5 prior art governor) to only 0.9 seconds (FIG. 4 governor of the invention). This represents an improvement of 68%.

The significant improvement in governor performance thereby is established.

Having thus described in detail preferred embodiments of the present invention, it will be apparent to those skilled in the art that many physical changes may be made in the apparatus without altering the inventive concepts and principles embodied therein. The present embodiments are therefore to be considered in all respects as illustrative and not restrictive, the scope of the invention being indicated by the appended claims.

I claim:

1. In a pneumatic pressure regulator comprising a ported housing having an internal bore, within the bore a spring-pressed piston mounted for reciprocation between advanced and retracted positions, and valve means in the piston and operative by movement of the piston to direct the flow of air to the respective housing ports; the improvement comprising a housing the bore of which is inwardly tapered uniformly in the direction of spring-pressed piston retraction throughout the length of the bore between said advanced and retracted positions, one of the piston and bore being fitted with annular O-rings, and the relative degree of taper of the bore and piston being predetermined to create substantially a condition of O-ring compression seal between bore and piston in the retracted position of the piston and a condition of floating O-ring seal with attendant reduced friction between bore and piston in the advanced position of the piston.

2. The pneumatic pressure regulator of claim 1 wherein the internal bore of the housing has the configuration of a truncated cone.

3. The regulator of claim 1 wherein the taper is substantially continuous for the entire length of the bore.

4. The regulator of claim 1 wherein the taper is present substantially only in the working area of the piston as it reciprocates between advanced and retracted positions.

5. The regulator of claim 1 wherein the degree of taper is substantially uniform in the working area of the piston.

6. The regulator of claim 1 wherein the tapered bore comprises a segmented tapered bore, the segments having differential degrees of taper.

7. The regulator of claim 6 wherein the greatest degree of taper is in the fully retracted position of the piston, to create a tightly sealed condition between piston and bore.

8. The regulator of claim 1 wherein the bore has a longitudinal center line and the degree of taper is from about 0°15' to about 5°0' with reference thereto.

9. The regulator of claim 1 wherein the bore has a longitudinal center line and the degree of taper is from about 0 15' to about 3 0' with reference thereto.

* * * * *